Feb. 27, 1934.    G. C. HILL    1,949,047
WHIPPING ATTACHMENT FOR DRINK MIXERS
Filed May 9, 1931
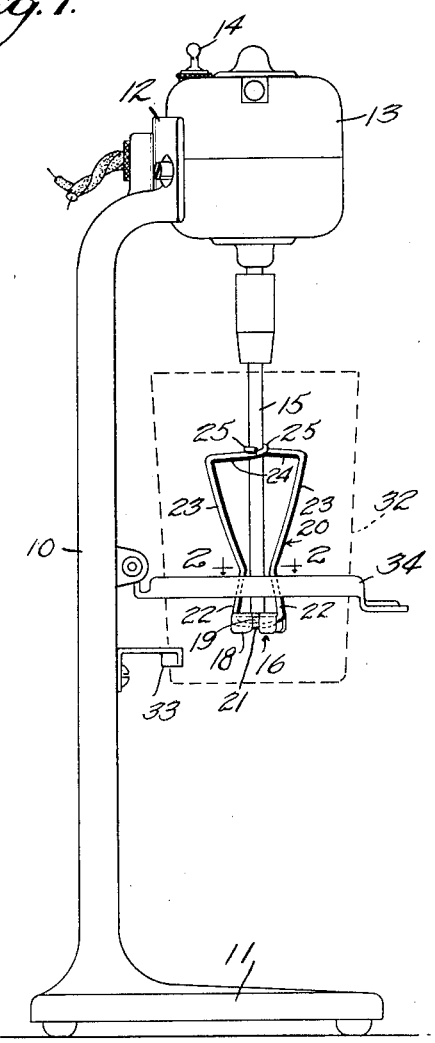
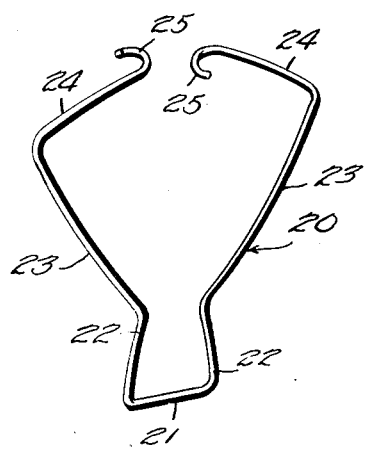
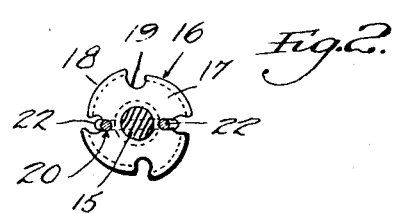
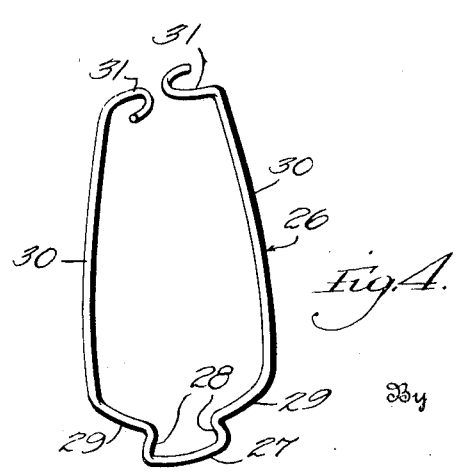
Inventor
GEORGE C. HILL
By C. L. Parker Jr.
Attorney Patented Feb. 27, 1934

1,949,047

UNITED STATES PATENT OFFICE 1,949,047

WHIPPING ATTACHMENT FOR DRINK MIXERS

George C. Hill, Sandusky, Ohio

Application May 9, 1931. Serial No. 536,271

5 Claims. (Cl. 259—135)

This invention relates to whipping attachments for drink mixers.

There is available on the market a drink mixer of the type wherein the motor is supported upon the upper end of a stand and is provided with a depending shaft having a mixer at its lower end operative for agitating and mixing drinks in an open-topped container slipped over the mixer shaft from below. Mixing devices of this character are highly efficient for mixing the ingredients of drinks or the like, but they cannot be employed for such purposes as whipping cream, the whites of eggs, etc., since the agitating action is not sufficient to accomplish the desired result.

An important object of the present invention is to provide a whipping attachment for drink mixers which may be quickly and readily attached to the elements of the mixing device for whipping cream, beating the whites of eggs, etc.

A further object is to provide a device of the character referred to which is extremely simple in construction and cheap to manufacture, and which is highly efficient in operation.

A further object is to provide a whipping attachment formed of a single piece of material and adapted through its inherent resiliency to be retained in operative position with respect to the mixer and shaft of a mixing device.

A further object is to provide a device of the character referred to which may be quickly attached and detached without the use of any separate fastening means and without altering the mixing device in any way, and which readily may be cleaned and sterilized.

Other objects and advantages of the invention will become apparent during the course of the following description.

In the drawing I have shown two embodiments of the invention. In this showing,

Figure 1 is a side elevation of a mixing device showing the invention applied,

Figure 2 is a section on line 2—2 of Figure 1,

Figure 3 is a perspective view of the whipping attachment, and,

Figure 4 is a similar view of a modified form of the device.

Referring to Figure 1, the numeral 10 designates the stand of a conventional drink mixer carrying a base 11 and an attaching head 12 to which is secured a motor 13. The motor may be of the type controlled by a switch closed when the container is placed in operative position, or may be provided with a manually controlled switch 14.

The motor is provided with a depending shaft 15 to the lower end of which is secured a mixing element 16. This element is shown as being in the form of a flat body 17 having depending circumferentially spaced flanges or blades 18 which are preferably convolute in shape, the body 17 being notched between the blades as at 19.

One form of the whipping device has been shown attached to the mixer in Figure 1, and has been illustrated in detail in Figure 3. As shown, the whipping device is indicated as a whole by 20 and is formed of a single piece of material, preferably resilient wire. At its central portion, the body of the whipping device is preferably formed with a substantially straight shank 21 at the opposite ends of which the body is provided with upwardly slightly converging arms 22. Above these arms the whipping device diverges upwardly and outwardly in arm portions 23 above which the ends of the body of the whipper extend inwardly and slightly upwardly as at 24. The extremities of the portions 24 are provided with oppositely opening hooks 25 adapted to engage the shaft 15. It will be noted that when the device is detached, the hooks 25 are spaced a substantial distance apart, and the hooks are movable inwardly against the inherent resiliency of the body.

The form of the device previously described is particularly intended for use with relatively wide topped containers, and a similar device adapted for use with narrower containers has been illustrated in Figure 4. The modified form of the device comprises a preferably resilient unitary body 26, which may be formed of wire as in the previous case. The body 26 is provided with a central shank 27 above which the body converges upwardly to some extent as at 28 and then extends outwardly as at 29. Above the latter portions, the opposite sides of the body 26 extend upwardly in relatively long slightly converging arms 30 at the upper ends of which are provided oppositely opening hooks 31. These hooks normally stand a substantial distance apart, whereby the body of the device will be tensioned when the hooks are brought together to the operative position to be described.

The operation of the form of the device illustrated in Figures 1 and 2 is as follows:

With the hooks 25 spread apart as shown in Figure 3, the device is placed in position with the straight shank 21 extending beneath the mixing device 16, and with the upwardly extending arms 22 arranged in diametrically opposite notches 19. The fingers of the operator are then pressed against the arms 23 to move them inwardly whereupon the hooks 25 are brought into engagement with the shaft 15.

With the parts so placed in position, the inherent resiliency of the body 20 will retain the hooks 25 in firm engagement with the shaft 15. The lower portion of the device is so shaped that the lower ends of the arm portions 22 will snugly engage in the innermost portions of the slots 19 when the device is first placed in position, and the inward flexing of the upper end of the device causes the arms 22 to tightly engage the notches 19 whereby the device will be effectively secured against downward movement.

The container with the material therein to be whipped is then placed in operative position around the shaft 15 and elements carried thereby. Any desired form of mixer can be employed, as previously stated, with any means for supporting the container in position. In the present instance, a container 32 has been illustrated in dotted lines resting against a support 33 and held in position by a ring 34. The tapered container will be effectively held in position by the means referred to without the necessity of the container being supported by hand.

The switch 14 is turned on with the container in position, and the whipper agitates the material to a far greater extent than is possible with the beating element, and the agitation takes place through a substantial depth of the material. It has been found that cream, whites of eggs, etc., can be completely whipped in a few moments.

The operation of the device illustrated in Figure 4 is identical with that previously described and need not be referred to in detail. The portions 28 of the body 26 tightly grip in the notches 19 when the device is in operative position with the hooks 31 in engagement with the shaft 15, and accordingly accidental displacement of the device is prevented. The form of the device illustrated in Figure 4 is particularly intended for use with narrow containers, while the device illustrated in Figure 3 is efficient in use with containers having somewhat wider or outwardly flaring upper ends.

It will be apparent that the device may be quickly and readily attached to the shaft and mixing device without the use of separate fastening elements of any kind. It also will be apparent that the device may be as readily detached, and due to its construction, it may be quickly and easily washed and sterilized.

It is to be understood that the forms of the invention herewith shown and described are to be taken as preferred examples of the same and that various changes in the shapes, size and arrangement of parts may be resorted to without departing from the spirit of the invention or the scope of the subjoined claims.

I claim:

1. A device of the character described comprising a unitary resilient body having a central shank portion adapted to lie against the bottom of a rotary mixing element having blades with spaces therebetween, the portions of the body at opposite sides of said shank portion extending upwardly for reception between the blades of the mixing element, the end portions of the body extending upwardly and outwardly and then inwardly toward each other and terminating in oppositely opening spaced hooks whereby said body is adapted to be flexed inwardly to bring said hooks into holding engagement with the shaft of the mixing element.

2. A device of the character described comprising a thin unitary resilient body having a substantially straight central shank portion adapted to lie against the bottom of a rotary mixing element, the portions of the body at opposite sides of said shank converging slightly upwardly for reception between the blades of the mixing element and engageable therewith, the portions of the body beyond said last named portions extending upwardly and then inwardly and terminating in oppositely opening normally spaced hooks adapted to be moved inwardly against the tension of the body whereby said hooks may be brought into holding engagement with the shaft of the mixing element and whereby the converging portions of the body may be brought into substantially tight engagement with the mixing element.

3. The combination with a shaft having a mixing element at its lower end, of a unitary resilient body bent intermediate its ends whereby its extremities are arranged opposite each other and normally spaced apart, the central portion of said body being engageable beneath the mixing element, the extremities of the body being provided with oppositely opening hooks whereby the ends of said body may be flexed inwardly to bring said hooks into engagement with the shaft.

4. The combination with a shaft having a mixing element at its lower end, of a unitary resilient body having a central shank portion adapted to lie against the bottom of the mixing element, the portions of the body at opposite sides of said shank portion extending upwardly for reception between the blades of the mixing element, the end portions of the body extending upwardly and outwardly and then inwardly toward each other and terminating in oppositely opening normally spaced hooks whereby said body is adapted to be flexed inwardly to bring said hooks into engagement with the shaft.

5. The combination with a shaft having a mixing element at its lower end, of a thin unitary resilient body having a substantially straight central shank portion adapted to lie against the bottom of the mixing element, the portions of the body at opposite sides of said shank converging slightly upwardly for reception between the blades of the mixing element and engageable against the latter, the portions of the body beyond said last named portions extending upwardly and then inwardly and terminating in oppositely opening normally spaced hooks movable inwardly against the tension of the body whereby said hooks may be brought into engagement with the shaft and the converging portions of the body may be brought into substantially tight engagement with the mixing element.

GEORGE C. HILL.